US010542682B1

(12) United States Patent
McCoy et al.

(10) Patent No.: US 10,542,682 B1
(45) Date of Patent: Jan. 28, 2020

(54) CONTAINER FOR GROWING PLANTS (71) Applicants: Mark McCoy, San Mateo, CA (US);
Joshua Serpa, San Mateo, CA (US)

(72) Inventors: Mark McCoy, San Mateo, CA (US);
Joshua Serpa, San Mateo, CA (US)

( * ) Notice: Subject to any disclaimer, the term of this patent is extended or adjusted under 35 U.S.C. 154(b) by 587 days.

(21) Appl. No.: 15/286,369

(22) Filed: Oct. 5, 2016

(51) Int. Cl.
*A01G 13/02* (2006.01)
*A01G 17/06* (2006.01)
*A01G 17/00* (2006.01)
*A01G 17/08* (2006.01)

(52) U.S. Cl.
CPC ....... *A01G 13/0237* (2013.01); *A01G 17/005* (2013.01); *A01G 17/06* (2013.01); *A01G 17/085* (2013.01)

(58) Field of Classification Search
CPC .. A01G 1/08; A01G 13/0237; A01G 13/0243; A01G 13/10; A01G 13/105; A01G 17/005; A01G 17/06; A01G 17/085; A01G 17/12; A01G 9/026; A01G 9/108
See application file for complete search history.

(56) References Cited

U.S. PATENT DOCUMENTS

| 223,093 | A | * | 12/1879 | Barnhill | A01G 13/0243 47/32.4 |
| 357,698 | A | * | 2/1887 | Burrough | A01G 9/04 47/71 |
| 514,306 | A | * | 2/1894 | Clines | A01G 13/0243 47/32.4 |
| 1,075,255 | A | * | 10/1913 | Helm | A01G 13/0243 47/32.4 |
| 1,380,327 | A | * | 5/1921 | Weil | A01G 23/02 47/76 |
| 2,140,932 | A | * | 12/1938 | Avery | A01G 9/026 162/143 |
| 2,656,969 | A | * | 10/1953 | Kvasnok | A01G 9/026 229/198.3 |
| 2,996,842 | A | * | 8/1961 | Weston | A01G 13/10 47/30 |

(Continued)

OTHER PUBLICATIONS

Stewart 2414005 23cm Tomato Pot—Black; Amazon.Co.UK; Aug. 18, 2011; ASIN: B005HVQA8I; <https://www.amazon.co.uk/Stewart-2414005-23-Tomato-Pot/dp/B005HVQA8I> (Year: 2011).*

(Continued)

*Primary Examiner* — Monica L Williams
*Assistant Examiner* — Michael A. Fabula
(74) *Attorney, Agent, or Firm* — Law Office of Michael O'Brien; Michael O'Brien (57) ABSTRACT

A container can be used for growing a plant having roots. The container can comprise a rectangular sheet having an upper edge, a lower edge, a first side edge and a second side edge. The first side edge and the second side edge are joined forming a cylinder. The upper edge is configured to rest above a ground surface such that vertical root growth is substantially uninhibited by the container above the ground surface. An inward contoured lip can be formed into the lower edge. The rectangular sheet from the upper edge to the inward contoured lip constrains lateral growth of the roots of the plant above the ground surface while vertical root growth is completely uninhibited by the container below the inward contoured lip.

9 Claims, 9 Drawing Sheets

(56) References Cited

U.S. PATENT DOCUMENTS

| | | | | |
|---|---|---|---|---|
| 3,550,318 | A * | 12/1970 | Remke | A01G 23/04 206/423 |
| 3,550,662 | A * | 12/1970 | Remke | A01G 23/043 383/107 |
| 3,814,239 | A * | 6/1974 | McGinley | B65D 85/52 206/423 |
| 4,574,522 | A | 3/1986 | Reiger | |
| 4,939,865 | A * | 7/1990 | Whitcomb | A01G 23/04 47/73 |
| 4,955,156 | A * | 9/1990 | Williams | A01G 13/105 47/32 |
| 5,099,607 | A * | 3/1992 | Lawton | A01G 9/029 47/73 |
| 6,038,810 | A * | 3/2000 | Kocsis, Jr. | A01G 13/0243 47/29.2 |
| 6,904,715 | B1 * | 6/2005 | Lawton | A01G 9/026 47/65.7 |
| 9,010,020 | B1 * | 4/2015 | Slusher | A01G 9/02 47/66.3 |
| 2005/0102892 | A1 * | 5/2005 | Jones | A01G 13/0243 47/29.7 |
| 2006/0026897 | A1 * | 2/2006 | Glover | A01G 9/02 47/65.8 |
| 2007/0157513 | A1 * | 7/2007 | Varney | A01G 9/026 47/65.8 |
| 2009/0025290 | A1 * | 1/2009 | Trabka | A01G 9/026 47/66.7 |
| 2010/0031567 | A1 * | 2/2010 | Ellegaard | A01G 9/0291 47/65.8 |
| 2011/0232175 | A1 * | 9/2011 | Cirello | A01G 9/026 47/32.7 |
| 2012/0011773 | A1 * | 1/2012 | Cross | A01G 9/026 47/65.8 |
| 2013/0055636 | A1 * | 3/2013 | Ager | A01G 9/026 47/66.7 |
| 2014/0208645 | A1 * | 7/2014 | Guggenheim | A01G 22/00 47/65.7 |
| 2016/0050855 | A1 * | 2/2016 | Munt, III | A01G 9/026 47/66.1 |
| 2017/0188525 | A1 * | 7/2017 | Paige, Sr. | A01G 13/0243 |
| 2017/0280635 | A1 * | 10/2017 | Petty | A63H 33/32 |
| 2018/0098512 | A1 * | 4/2018 | Robeck | A01G 9/006 |

OTHER PUBLICATIONS

Elixir Gardens Ring Culture Pots/Tomato Pots, Bottomless Pots × 12; Amazon.Co.UK; May 16, 2014; ASIN: B00EQ7ZOBS; <https://www.amazon.co.uk/Elixir-Gardens-CULTURE-TOMATO-BOTTOMLESS/dp/B00EQ7ZOBS/>. (Year: 2014).*

* cited by examiner

CONTAINER FOR GROWING PLANTS

BACKGROUND

The present invention relates to an improved raised fabric container for laterally controlled above grade root growth and uninhibited below grade root growth, and more particularly, to an improved raised fabric container for accelerated laterally controlled above grade root growth that is fully open or partially open to the ground or grow medium beneath it for uninhibited below grade root growth conveying the advantages of planting directly in the ground including greater root mass potential, as well as, the advantages of an above grade container including removed proximity from ground pests, molds and mildews, ease of pruning and trimming, ease of uprooting for removal if and when required, and a surface contoured aesthetic for landscaping and earth retention purposes.

At the present state of the art the process for planting and growing trees, shrubs and other plants involves planting directly in the ground, in rigid pots or containers, in rigid beds, or in soft woven or non-woven fabric containers.

Although planting directly in the ground has been effectively sufficient since the domestication of plants by humans its many drawbacks and challenges include plant-inappropriate soils requiring extensive tilling and amendment, close proximity of lower plant canopy and stem to various ground born pests, molds and mildews, inadequate aeration, low canopy requiring stooping or laying on the ground to prune and trim, and difficulty in uprooting and removal if and when required.

Various rigid pots are well known in the art and the most common type of container within which trees, shrubs and other plants are planted. It is well known in the art that by bringing the plant above grade in a container its stem and canopy proximity to ground born pests, molds, and mildews is distanced and pruning and trimming is easier. Although rigid pots are susceptible to low cost of manufacture using modern polymers instead of traditional materials such as wood or ceramic, thus explaining their modern popular embracement, there are many disadvantages in practice including: insufficient aeration, growth limited to the size of the container, root binding due to inability of non-porous material to air prune resulting in root overgrowth leading to decline in plant health, inflexible size and shape that often fails to maximize the growth potential of a particular space.

Rigid planting beds have also been well known in the art and convey many of the same advantages and disadvantages of rigid containers. Rigid beds can be built to maximize the growth potential of a particular space; however, they are labor and material intensive and often create additional difficulties in uprooting for removal when and if required.

There are various types of soft woven and non-woven fabric containers. The fabric construction and soft and pliable nature of these containers makes them less expensive to produce and ship, easy to install, offers greater aeration and drainage than rigid containers for accelerated growth and air pruning of root ends preventing over growth and binding, and convey the advantages of a raised container including greater stem and canopy proximity from ground born pests, molds and mildews, as well as, ease of pruning, trimming, and uprooting for removal when and if required. As with rigid containers; however, growth potential is still limited to the size of the container and because soft containers come in fixed shapes, generally either round, oval or vertical seam patterned square, the ability to maximize the growth potential of a particular space and the ability to create contoured aesthetics is greatly limited.

A root control bag is taught in U.S. Pat. No. 4,574,522 as a "process for growing nursery stock involving the specific improvement of confining root propagation to a nonwoven porous polymeric bag such that growth through the bag is severely constricted at the fabric, producing a girdling effect and root branching within the bag." The goal of this approach is to convey the improved aeration and drainage of a fabric container that results in accelerated growth rates and healthy robust plants, and also to ease the effort required to move and transplant the plant within. Specifically, it is taught that growing in such a nonwoven porous polymeric bag encourages the development of a "highly root branched soil ball" that is "effective in re-establishing" the plant upon transplanting. This type of soft container is highly useful in the commercial nursery business, but as is taught it is intended to confine root growth, which will limit the ultimate growth potential of the plant making it inappropriate for permanent or semi-permanent applications or applications where maximum growth or earth retention potential is desired.

The inventors of the present art initially used modified versions of currently available fabric containers as taught in U.S. Pat. No. 4,574,522 to both validate the utility and determine the need for the preferred embodiments of a raised fabric container for laterally controlled above grade and uninhibited below grade root growth as taught herein. The present art offers several novel improvements in the art for the intended purposes including a preferred fabric cut and stitch pattern for creating a contoured lower edge to ease installation, improve durability, and reduce manufacturing costs; novel means of shaping and reinforcing using eyelets and cord/webbing; and a novel means of shaping and reinforcing using vertical post, horizontal, or axial reinforcements, or any combination thereof; and novel methods and processes for installation of a raised fabric container for laterally controlled above grade and uninhibited below grade root control.

Geotextile fabrics are known to be highly functional for earth reinforcement, contouring, and architectural applications when patterned, assembled, and filled with an appropriate geological medium such as soil, sand, gravel, rock aggregate or any combination thereof. Used in this manner, geotextile fabrics can be used to create cost effective retaining walls, drainage, and erosion control measures, as well as, ground contouring for landscaping and aesthetic benefit. The present invention seeks to benefit these capabilities of geotextile fabrics while expanding upon the usefulness thereof and improve upon the current state of the art of soft fabric containers used for growing plants and ground contouring. Because the present art enables roots to grow uninhibited below grade, it presents aesthetic and retention benefits when paired with appropriate plant species as it's well known that the root structures of plants are Nature's earth retention system of choice

SUMMARY

A container can be used for growing a plant having roots. The container can comprise a rectangular sheet having an upper edge, a lower edge, a first side edge and a second side edge. The first side edge and the second side edge are joined forming a cylinder. The upper edge is configured to rest above a ground surface such that vertical root growth is substantially uninhibited by the container above the ground surface. An inward contoured lip can be formed into the lower edge. The rectangular sheet from the upper edge to the inward contoured lip constrains lateral growth of the roots of the plant above the ground surface while vertical root growth is completely uninhibited by the container below the inward contoured lip.

In some embodiments, the inward contoured lip can further comprise a plurality of cutouts, formed into the rectangular sheet. Edges of the plurality of cutouts are joined together forming the inward contoured lip.

In some embodiments, the plurality of cutouts can further comprise a first edge cutout smoothly connected to a first parallel section. A first triangular cutout can be smoothly connected to the first parallel section and a second parallel section. A second triangular cutout can be smoothly connected to the second parallel section and a third parallel section. A third triangular cutout can be smoothly connected to the third parallel section and a fourth parallel section. A fourth triangular cutout can be smoothly connected to the fourth parallel section and a fifth parallel section. A fifth triangular cutout can be smoothly connected to the fifth parallel section and a sixth parallel section. A second edge cutout can be smoothly connected to a sixth parallel section.

In some embodiments, a plurality of pockets can be attached to the cylinder. A rod can be inserted through one of the plurality of pockets. The plurality of rods tethers the cylinder to a ground surface. A trellis can be joined to the plurality of rods.

A plurality of horizontal reinforcement bands can be wrapped around the cylinder to prevent deformation of the cylinder upon vertical loading. A plurality of axial reinforcement bands can be connected the upper edge and the lower edge around the cylinder to prevent deformation of the cylinder upon vertical loading.

A plurality of eyelets can be attached within the cylinder. A plurality of cords can be connected the eyelets and reshaping the container from the cylinder to a different shape.

A plurality of straps can be attached to the first side edge. A plurality of fasteners attached to the second side edge. The first side edge and the second side edge can be joined by connecting the plurality of straps to the plurality of fasteners.

In some embodiments, a process for growing a plant P having roots R can include the following steps, which are not necessarily in order. First, inserting the roots of the plant into a container. Then, inserting the container into a ground surface. Next, restricting lateral growth of the roots of the plant above the ground surface. Finally, enabling vertical growth of the roots below the container.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 7:
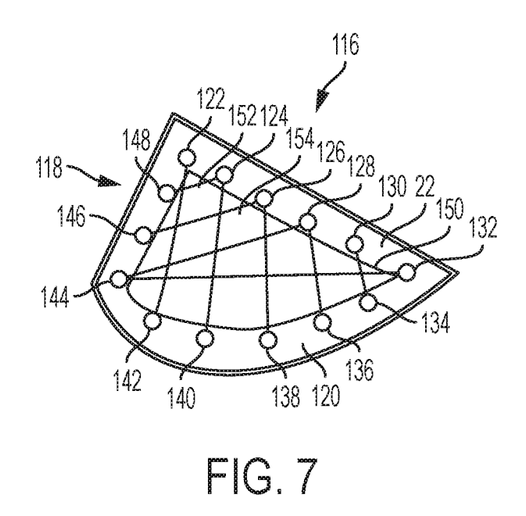
FIG. 7 shows a side view of one embodiment of the present invention.
Figure 8:
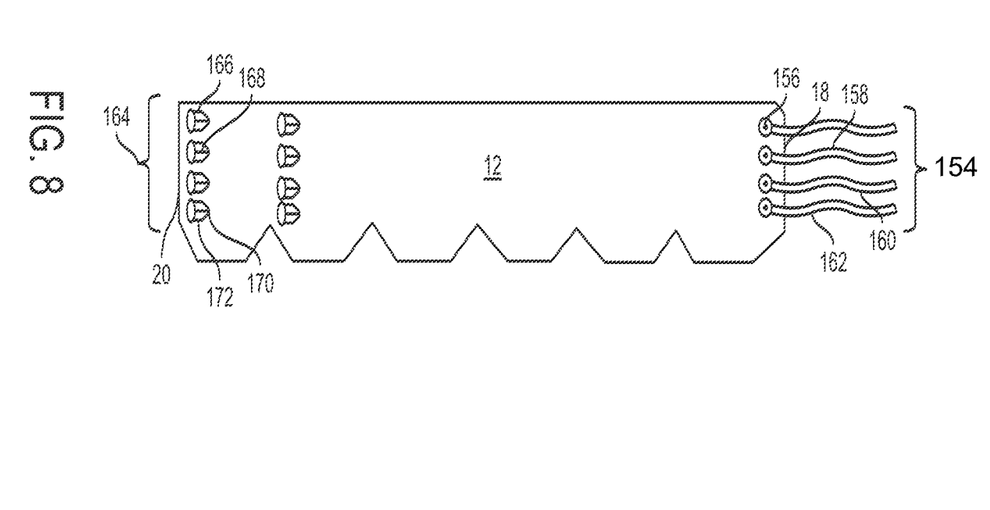
FIG. 8 shows a plan view of one embodiment of the present invention.
Figure 9:
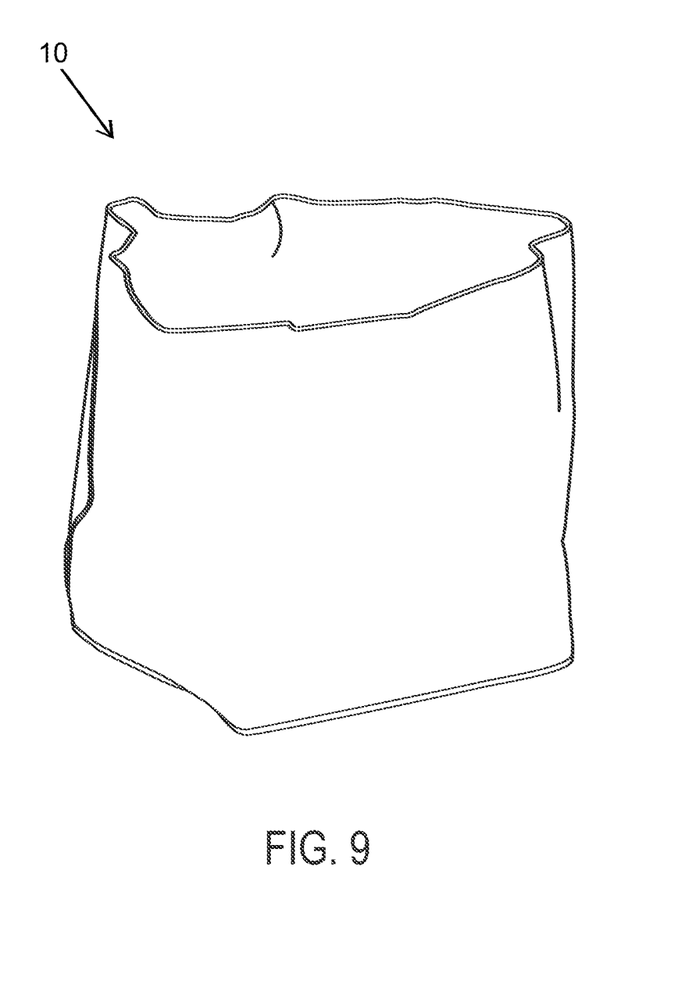
FIG. 9 shows a perspective view of one embodiment of the present invention.

By way of example, and referring to FIGS. 1-9, one embodiment of a container 10 for growing a plant P having roots R comprises a rectangular sheet 12 having an upper edge 14, a lower edge 16, a first side edge 18 and a second side edge 20. The first side edge 18 and the second side 20 edge are joined forming a cylinder 22. The upper edge 14 is configured to rest above a ground surface G such that vertical root growth is substantially uninhibited by the container 10 above the ground surface G. A container 10 without plant P and roots R is shown in FIG. 9.

An inward contoured lip 24 is formed into the lower edge 16; wherein the rectangular sheet 12 from the upper edge 14 to the inward contoured lip 24 constrains lateral growth of the roots R of the plant P above the ground surface G while vertical root growth is completely uninhibited by the container 10 below the inward contoured lip 24.

The inward contoured lip 24 further comprises a plurality of cutouts 26, formed into the rectangular sheet; wherein edges of the plurality of cutouts 26 are joined together forming the inward contoured lip 24.

Figure 1:
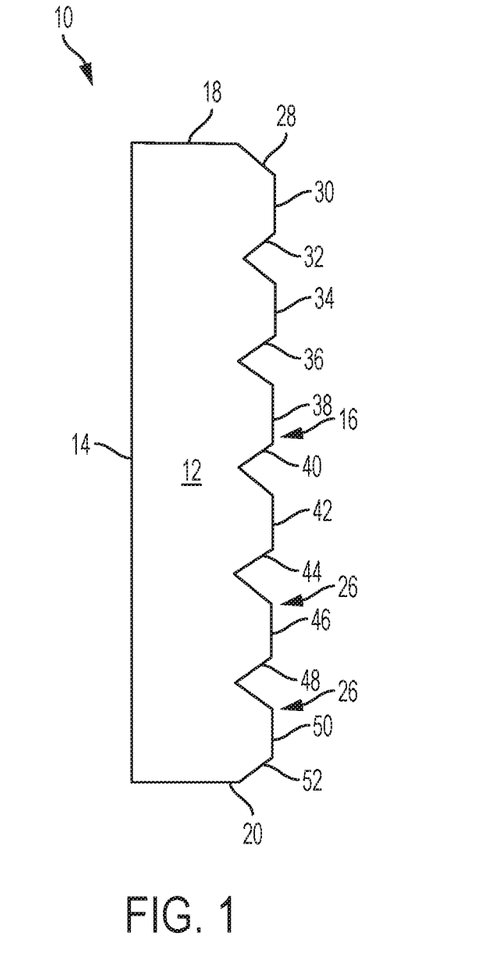
FIG. 1 shows a plan view of one embodiment of the present invention.

The plurality of cutouts 26 further comprise: a first edge cutout 28 smoothly connected to a first parallel section 30. A first triangular cutout 32 is smoothly connected to the first parallel section 30 and a second parallel section 34. A second triangular cutout 36 is smoothly connected to the second parallel section 34 and a third parallel section 38. A third triangular cutout 40 is smoothly connected to the third parallel section 38 and a fourth parallel section 42. A fourth triangular cutout 44 is smoothly connected to the fourth parallel section 42 and a fifth parallel section 46. A fifth triangular cutout 48 is smoothly connected to the fifth parallel section 46 and a sixth parallel section 50. A second edge cutout 52 is smoothly connected to a sixth parallel section 50.

In some embodiments, rectangular sheet 12 can be a cut fabric pattern for a raised fabric container for laterally controlled above grade and uninhibited below grade root growth prior to assembly consisting of a planar section of geotextile fabric with triangular cut-outs and partial triangular cut-outs on the opposing ends and of the planar section of geotextile fabric so that when joined into a continuous band by sewing together the opposing ends of the planar section geotextile fabric it is made possible to contour one side of the band by sewing together the opposing sides of each triangular void, and thus shortening the inner diameter, in turn, creating an inward contoured lip 24 of what will be the lower edge of the raised fabric container for laterally controlled above grade and uninhibited below grade root growth upon installation.

Figure 2:
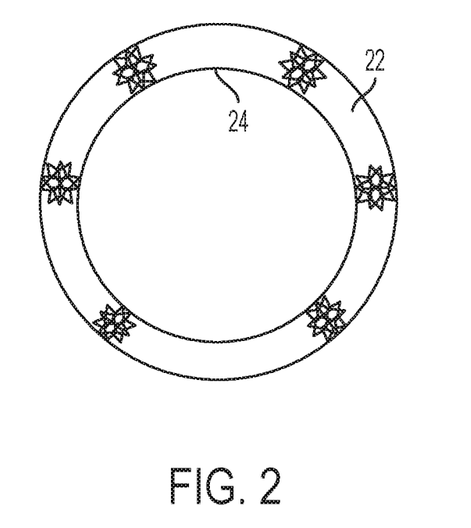
FIG. 2 shows a top view of one embodiment of the present invention.

In some embodiments, FIG. 2 can show an example where the inward contoured lip 24 formed by sewing the triangular cut-outs together as shaping seams forming the inward contoured lip 24 that great improves the ease of installing a raised fabric container for laterally controlled above grade and uninhibited below grade root growth by preventing soil/media from spilling out while being filled.

Figure 3:
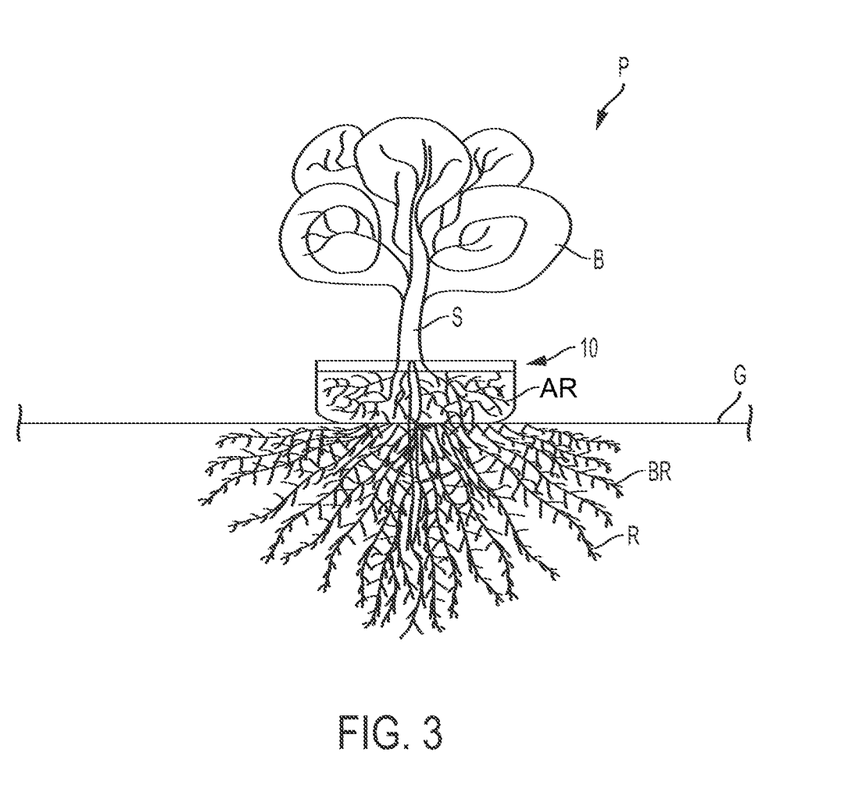
FIG. 3 shows a front view of one embodiment of the present invention.

In some embodiments, FIG. 3 can show an example of the container 10, installed and planted on a ground surface G. The raised fabric container for laterally controlled above grade and uninhibited below grade root growth shows a cut-away perspective so that the below ground surface G root growth zone BR, above ground surface G root growth zone AR from which the depicted plant P grows above grade a stem S and branching/foliage B can be visibly demonstrated.

Figure 4:
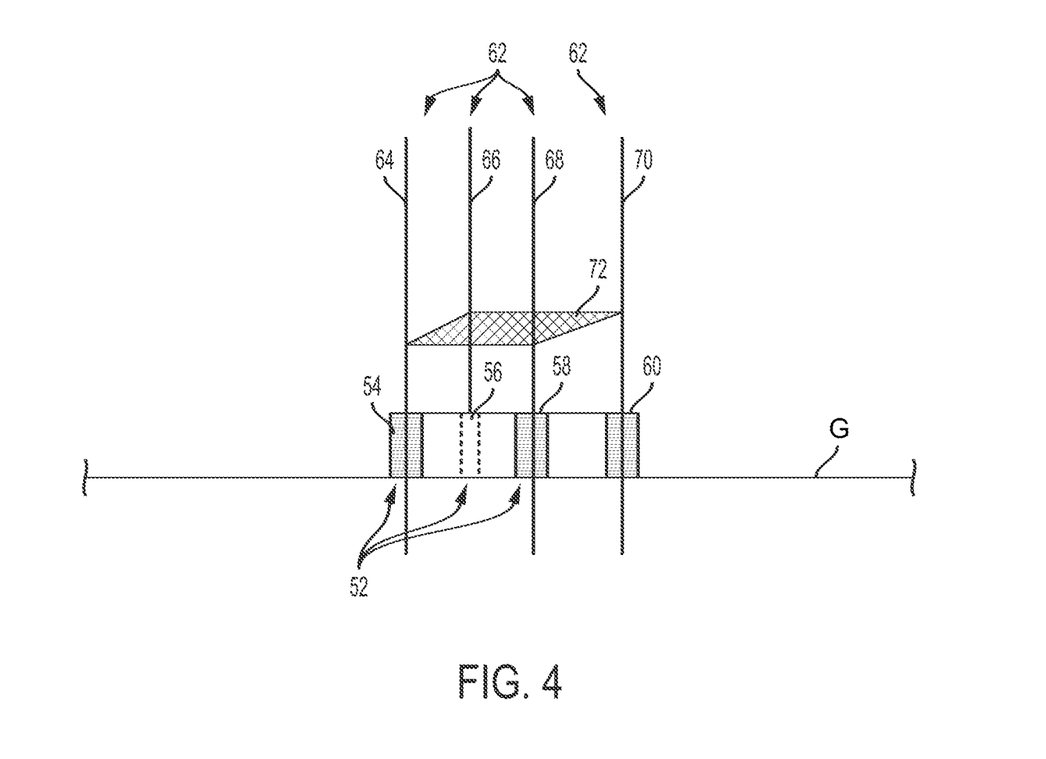
FIG. 4 shows a side view of one embodiment of the present invention.

Turning to FIG. 4, in some embodiments a plurality of pockets 52 can be attached to the cylinder 22. The plurality of pockets 52 can further include, first pocket 54, second pocket 56, third pocket 58 and fourth pocket 60. A plurality of rods 62 can include first rod 64, second rod 66, third rod 68 and fourth rod 70. Each rod is inserted through one of the plurality of pockets 52. In this manner, the plurality of rods 62 tethers the cylinder 22 to a ground surface G. In some embodiments, a trellis 72 can be joined to the plurality of rods 62.

In one example, the plurality of pockets 52 can be extended vertical post reinforcements through which extend the plurality of rods 62. The plurality of rods 62 only need to extend substantially to the top of the raised fabric container for laterally controlled above grade and uninhibited below grade root growth to achieve the desired supporting function; however, are extended for the purpose of also supporting the trellis 72 in what would be a preferred, though not limiting, embodiment of the present invention.

There are other ways to provide structural support for the cylinder 22. For instance, in FIG. 5, a plurality of horizontal reinforcement bands 74 can be wrapped around the cylinder 22 to prevent deformation of the cylinder upon vertical loading. The plurality of horizontal reinforcement bands 74 can further include first horizontal band 76, second horizontal band 78 and third horizontal band 80.

Figure 5:
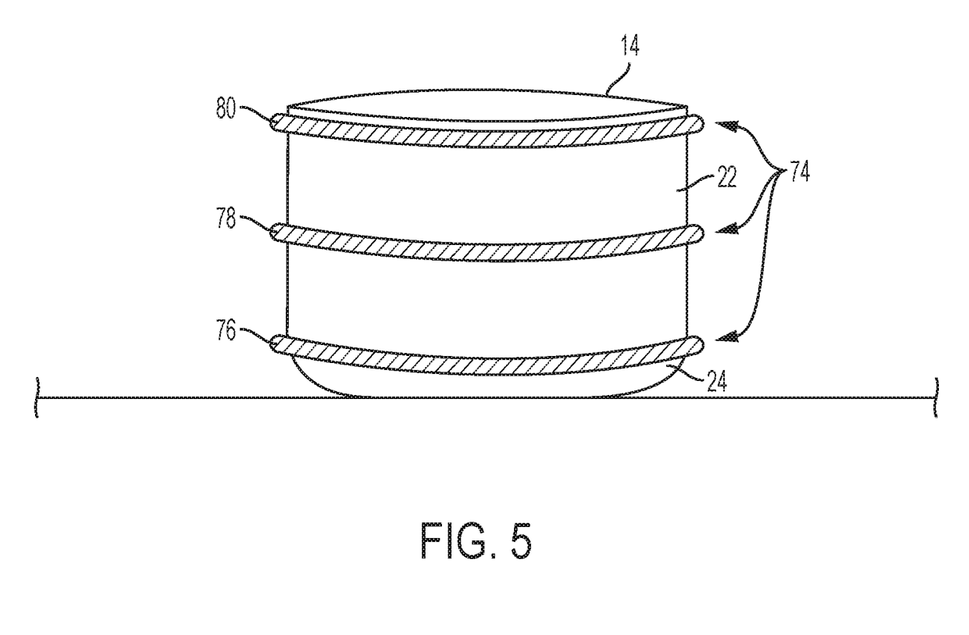
FIG. 5 shows a side view of one embodiment of the present invention.

The plurality of horizontal reinforcement bands 74 can be circular as shown in FIG. 5 for reinforcing a substantially circular raised fabric container for laterally controlled above grade and uninhibited below grade root growth or could be of other shapes, i.e. rectilinear or polygonal, and constructed of inexpensive polyvinyl chloride (PVC) tubing with straight or angled connections, or other suitable materials, depending upon the shape desired that is inserted into circumferentially located loops or sleeves with access gaps or overlaps anchored into or sewn onto the outer or inner side of the raised fabric container for laterally controlled above grade and uninhibited below grade root growth. If a rectilinear or polygonal shape is desired the final shape will be determined by the insertion and final assembly by adaptor of the horizontal supports, and of course, the filling of the raised fabric container for laterally controlled above grade and uninhibited below grade root growth with soil or other medium.

Figure 6:
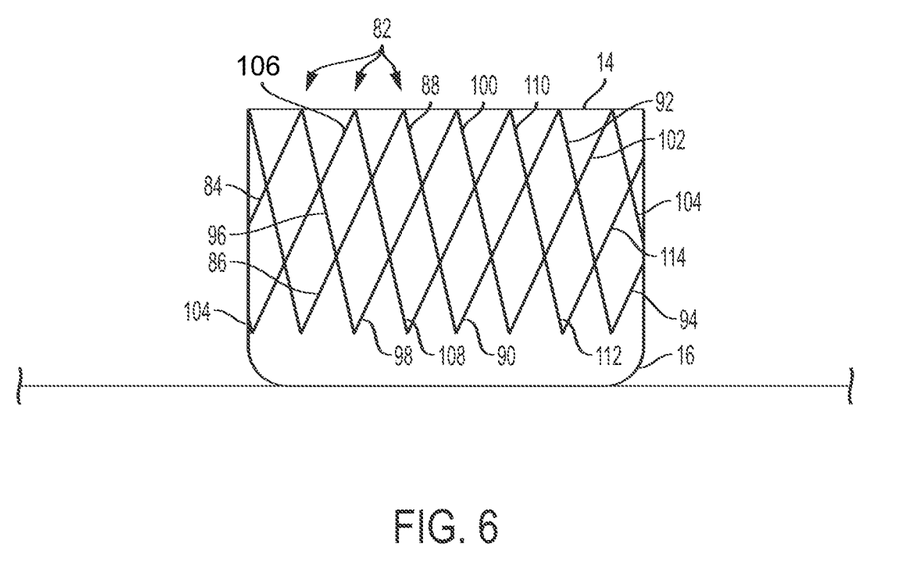
FIG. 6 shows a side view of one embodiment of the present invention.

In FIG. 6, a plurality of axial reinforcement bands 82, connecting the upper edge 14 and the lower edge 16 can be placed around the cylinder 22 to prevent deformation of the cylinder 22 upon vertical loading. The plurality of axial reinforcement bands 82 can further include first downward segment 84 joined to first upward segment 86. Second downward segment 88 is joined to first upward segment 86 and second upward segment 90. Third downward segment 92 is joined to second upward segment 90 and third upward segment 94. Fourth downward segment 96 is joined to third upward segment 94 and fourth upward segment 98. Fifth downward segment 100 is joined to fourth upward segment 98 and fifth upward segment 102. Sixth downward segment 104 is joined to fifth upward segment 102 and sixth upward segment 106. Seventh downward segment 108 is joined to sixth upward segment 106 and seventh upward segment 110. Eighth downward segment 112 is joined to seventh upward segment 110 and eighth upward segment 114. More segments can be used as desired.

In some embodiments, the axial reinforcement bands 82 can provide a raised fabric container for laterally controlled above grade and uninhibited below grade root growth that stands vertically prior to being filled with soil or other medium and without the need for vertical supports to achieve the same. This embodiment of the present invention would increase materials and production cost slightly, but ease installation and on-site assembly.

Turning to FIG. 7, a plurality of eyelets 116 can be formed within the cylinder 22. A plurality of cords 118 can connect the eyelets 116 and reshape the container from the cylinder 22 to a different shape 120. In some embodiments, the plurality of eyelets 116 can further comprise: first eyelet 122, second eyelet 124, third eyelet 126, fourth eyelet 128, fifth eyelet 130, sixth eyelet 132, seventh eyelet 134, eighth eyelet 136, ninth eyelet 138, tenth eyelet 140, eleventh eyelet 142, twelfth eyelet 144, thirteenth eyelet 146 and fourteenth eyelet 148. Cord 150 connects the plurality of eyelets 116. In some embodiments, cord 152 can connect some of the plurality of eyelets 116 as well.

In some embodiments, the plurality of eyelets 116 can be located on the inner-most edge of the contoured lower edge 24, and exemplified cord/webbing connections between the plurality of eyelets 116 used for the shaping and reinforcing of an asymmetrical shape that could be desirable for making the most of a corner space for example. The plurality of eyelets 116 could be pre-installed as part of the manufacturing of the raised fabric container for laterally controlled above grade and uninhibited below grade root growth and positioned for obtaining a specific shape, or could be pre-installed in a continuous circuit of equilateral spacing, or could be installed in the field for greatest level of flexibility and customizable shaping Turning to FIG. 8, in some embodiments, rectangular sheet 12 can be attached to a plurality of straps 154 at the first side edge 1. The plurality of straps can include first strap 156, second strap 158, third strap 160 and fourth strap 162. Rectangular sheet 12 can be further attached to a plurality of fasteners 164 at the second side edge 20. The plurality of fasteners 164 can further comprise first fasteners 166, second fasteners 168, third fasteners 170 and fourth fasteners 172.

FIG. 8 shows a means for adjustable outer dimensions prior to assembly consisting of a section of geotextile fabric patterned as in FIG. 1 for contouring of what will become an inwardly projecting lower edge with the addition of a plurality of straps 154 on one end and two sets incrementally offset plurality of fasteners 164 on the opposing end enabling two different assembled outer diameters, and in turn, two different total soil/medium volume potentials. The straps and fasteners and two options for adjustability illustrated are only an exemplification of a preferred embodiment of the present invention and not intended in any way to limit its scope. The means of adjustability could also be hooks on one side of one end of the cut fabric pattern for a raised fabric container for laterally controlled above grade and uninhibited below grade root growth and loops on the other side of the opposing end of the cut fabric pattern for a raised fabric container for laterally controlled above grade and uninhibited below grade root growth, or other functional means of attachment end to end and/or overlapping surface to overlapping surface. Besides the obvious utility of being able to adjust not just the shape, but also the ultimate size of the raised fabric container for laterally controlled above grade and uninhibited below grade root growth within a given range, additional utility of such adjustability is the ability to control the size of the plant and the nature of the root mass by constricting and air/pruning via a smaller size for an appropriate period of plant development, and then enlarging for subsequent continued plant development and enlargement by increasing the soil/medium volume, and in turn, the root mass potential.

In some embodiments, a process for growing a plant P having roots R can include the following steps, which are not necessarily in order. First, inserting the roots of the plant into a container. Then, inserting the container into a ground surface. Next, restricting lateral growth of the roots of the plant above the ground surface. Finally, enabling vertical growth of the roots below the container.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A container for growing a plant having roots; the container comprising:
    a rectangular sheet having an upper edge, a lower edge, a first side edge and a second side edge; wherein the first side edge and the second side edge are joined forming a cylinder; wherein the upper edge is configured to rest above a ground surface such that vertical root growth is substantially uninhibited by the container above the ground surface;
    an inward contoured lip, formed into the lower edge; wherein the rectangular sheet from the upper edge to the inward contoured lip constrains lateral growth of the roots of the plant above the ground surface while vertical root growth is completely uninhibited by the container below the inward contoured lip; wherein the inward contoured lip further comprises a plurality of cutouts, formed into the rectangular sheet; wherein edges of the plurality of cutouts are joined together forming the inward contoured lip.

2. The container of claim 1, wherein the plurality of cutouts further comprise:
    a first edge cutout connected to a first parallel section;
    a first triangular cutout, connected to the first parallel section and a second parallel section;
    a second triangular cutout, connected to the second parallel section and a third parallel section;
    a third triangular cutout, connected to the third parallel section and a fourth parallel section;
    a fourth triangular cutout, connected to the fourth parallel section and a fifth parallel section;
    a fifth triangular cutout, connected to the fifth parallel section and a sixth parallel section; and
    a second edge cutout connected to a sixth parallel section.

3. The container of claim 2,
    a plurality of pockets; attached to the cylinder;
    a plurality of rods, wherein each rod is inserted through one of the plurality of pockets; wherein the plurality of rods tethers the cylinder to a ground surface.

4. The container of claim 3, further comprising a trellis, joined to the plurality of rods.

5. The container of claim 4, further comprising a plurality of horizontal reinforcement bands, wrapped around the cylinder to prevent deformation of the cylinder upon vertical loading.

6. The container of claim 5, further comprising a plurality of axial reinforcement bands, connecting the upper edge and the lower edge around the cylinder to prevent deformation of the cylinder upon vertical loading.

7. The container of claim 5, further comprising:
    a plurality of eyelets, attached within the cylinder;
    a plurality of cords, connecting the eyelets and reshaping the container from the cylinder to a different shape.

8. The container of claim 7, further comprising:
    a plurality of straps, attached to the first side edge;
    a plurality of fasteners attached to the second side edge;
    wherein the first side edge and the second side edge are joined by connecting the plurality of straps to the plurality of fasteners.

9. A process for growing a plant having roots; the process comprising:
    inserting the roots of the plant into a container; wherein the container further comprises:
        a rectangular sheet having an upper edge, a lower edge, a first side edge and a second side edge; wherein the first side edge and the second side edge are joined forming a cylinder; wherein the upper edge is configured to rest above a ground surface such that vertical root growth is substantially uninhibited by the container above the ground surface;
        an inward contoured lip, formed into the lower edge; wherein the rectangular sheet from the upper edge to the inward contoured lip constrains lateral growth of the roots of the plant above the ground surface while vertical root growth is completely uninhibited by the container below the inward contoured lip; wherein the inward contoured lip further comprises a plurality of cutouts, formed into the rectangular sheet; wherein edges of the plurality of cutouts are joined together forming the inward contoured lip;

placing the container onto a ground surface;

restricting lateral growth of the roots of the plant above the ground surface; and enabling vertical growth of the roots below the container.

\* \* \* \* \*